United States Patent
Moizio et al.

(12)

(10) Patent No.: US 6,598,007 B2
(45) Date of Patent: Jul. 22, 2003

(54) DIGITAL CONTROL LOOP

(75) Inventors: Frank J. Moizio, Dallas, TX (US); Steven R. Magee, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/755,427

(22) Filed: Jan. 5, 2001

(65) Prior Publication Data

US 2001/0030999 A1 Oct. 18, 2001

Related U.S. Application Data

(60) Provisional application No. 60/174,558, filed on Jan. 5, 2000.

(51) Int. Cl.$^7$ .............................................. G01P 3/00
(52) U.S. Cl. ......................... 702/145; 702/79; 702/148
(58) Field of Search ............................. 702/79, 89, 96, 702/142, 145–148; 375/225; 318/472, 934, 937

(56) References Cited

U.S. PATENT DOCUMENTS 4,307,325 A * 12/1981 Saar .......................... 318/334
RE33,379 E * 10/1990 Bradus ....................... 388/812

* cited by examiner

Primary Examiner—Bryan Bui
(74) Attorney, Agent, or Firm—Carlton H. Hoel; W. James Brady; Frederick J. Telecky, Jr.

(57) ABSTRACT

Asynchronous position pulses drive an interrupt to store pulse times via direct memory access; then synchronous sampling and analysis of the stored position pulse timings provides rate detection useful for feedback as useful in motor control.

6 Claims, 6 Drawing Sheets

DIGITAL CONTROL LOOP

RELATED APPLICATIONS

This patent applications claims priority from provisional application Ser. Nos. 60/174,558, filed Jan. 5, 2000.

BACKGROUND OF THE INVENTION

The invention relates to electronic devices, and, more particularly, to real-time control and circuitry and methods.

Automatic motor control generally includes sensing the current state of the motor (e.g., shaft position or shaft velocity) plus a feedback of the difference between the sensed state and the desired state to control the motor input. Many digital motor control systems using digital signal processors (DSPs) require the acquisition of information from a feedback digital transducer. The information from a transducer such as an encoder is in the form of a digital pulse stream and represents the position of the mechanism under control. The frequency of this pulse stream is dictated by two factors (1) the speed of the mechanism under control (as measured by the transducer) and (2) the resolution of the transducer The frequency range of this position pulse stream from the transducer can be large and may or may not occur at a periodic rate. In contrast, digital control algorithms must happen at a fixed frequency rate, which means that the CPU of the DSP must operate at a constant rate.

Furthermore, in many digital motor control applications, it is necessary to measure velocity information so that the algorithms residing within the DSP can use the information to compute the required control functions. Hence, a collection technique which allows for the:

(1) asynchronous acquisition of position data, (2) periodic computation of CPU algorithms, and (3) conversion of position data to velocity data with minimal drain on CPU resources is highly desirable.

SUMMARY OF THE INVENTION

The invention provides asynchronous digital data acquisition via direct memory access plus periodic sampling of the acquired data for analysis and control output.

This has advantages including a low cost way of attaining velocity information from a position transducer in a DSP motor control application, while meeting the desired criteria of asynchronous acquisition of position data, periodic computation of CPU algorithms, and conversion of position data to velocity data with minimal drain on CPU resources. Since the output of the position transducer is directly connected to the DSP (with DMA), no external hardware is required.

BRIEF DESCRIPTION OF THE DRAWINGS

The drawings are heuristic for clarity.

DESCRIPTION OF THE PREFERRED EMBODIMENTS

Overview

Figure 1:
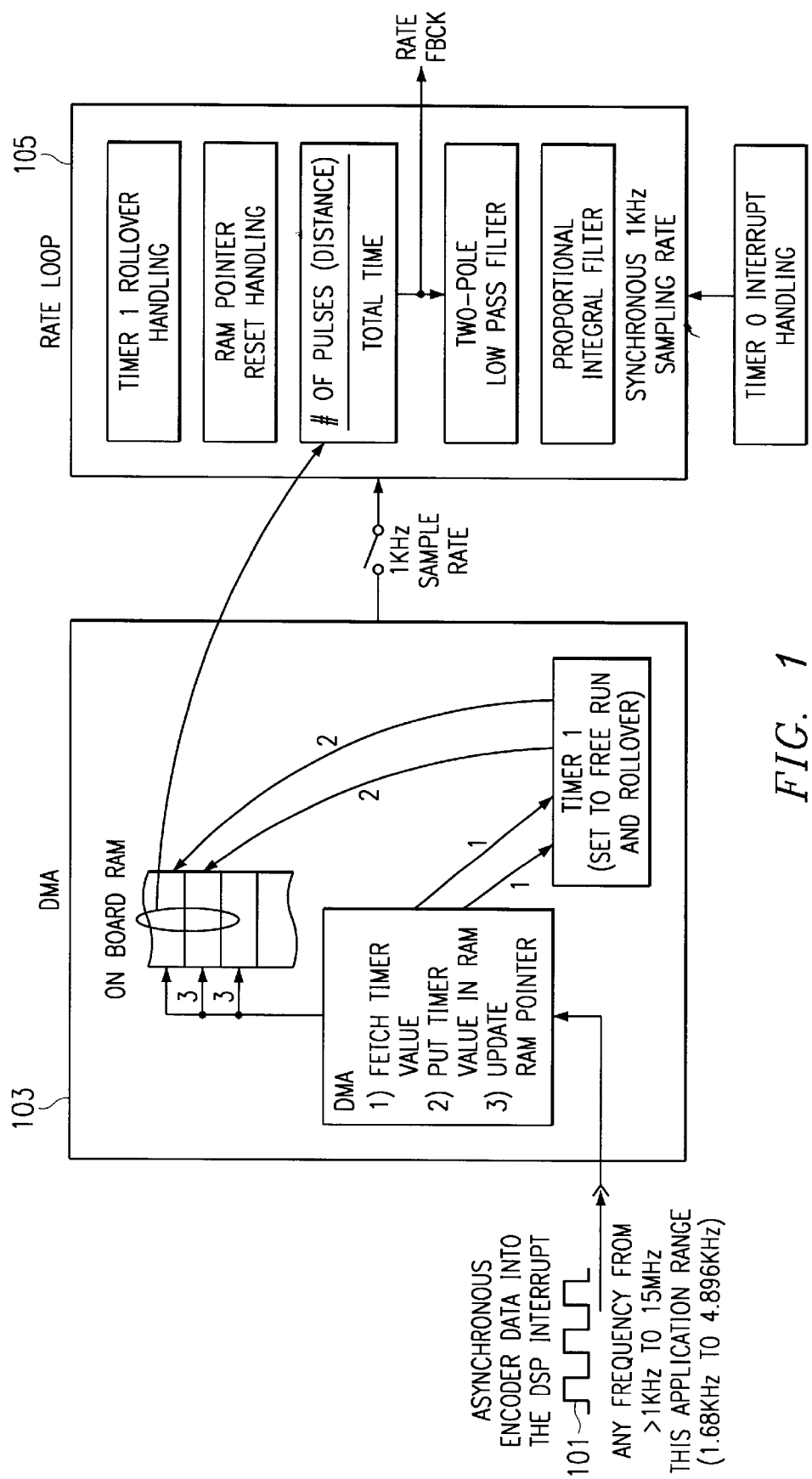
FIG. 1 shows a preferred embodiment in functional format.

The preferred embodiments provide an asynchronous to synchronous interface as part of rate feedback from a position signal. FIG. 1 illustrates use of DMA and timers in a DSP to asynchronously acquire times and synchronously compute rates. In particular, continuously input the position pulse stream 101 to an interrupt input of a digital processor (e.g., a DSP with on-board memory) and handle the interrupt (via DMA 103) by (1) fetching the time of the interrupt, (2) storing this time in a memory location and (3) incrementing the memory location pointer. Simultaneously, compute (using rate loop 105) the position pulse rate (Rate Fbck) by sampling the memory location pointer and corresponding timer value and dividing the increments. Optionally, smooth this derived position pulse rate (low pass filtered). The difference between this detected position pulse rate and the desired rate provides the feedback signal for input control. This effectively creates an asynchronous-synchronous interface for the position pulses to feed the digital processor via the DMA.

FIG. 1 shows the use of timer 1 for detecting the time of position pulse interrupts and timer 0 for creating interrupts for the synchronous sampling. And FIG. 3 illustrates the functional blocks of a TMS320C32 DSP which provides timers and DMA for implementation of preferred embodiments.

The preferred embodiments maximize DSP CPU throughput which in turn maximizes motor control loop bandwidth over a wide range of operating conditions. Furthermore, this technique provides an inherent store of instantaneous rate feedback information. This information can be used, in turn, by other DSP-hosted algorithms for the implementation of functions such as transducer artifact removal.

Preferred embodiment systems

Figure 2:
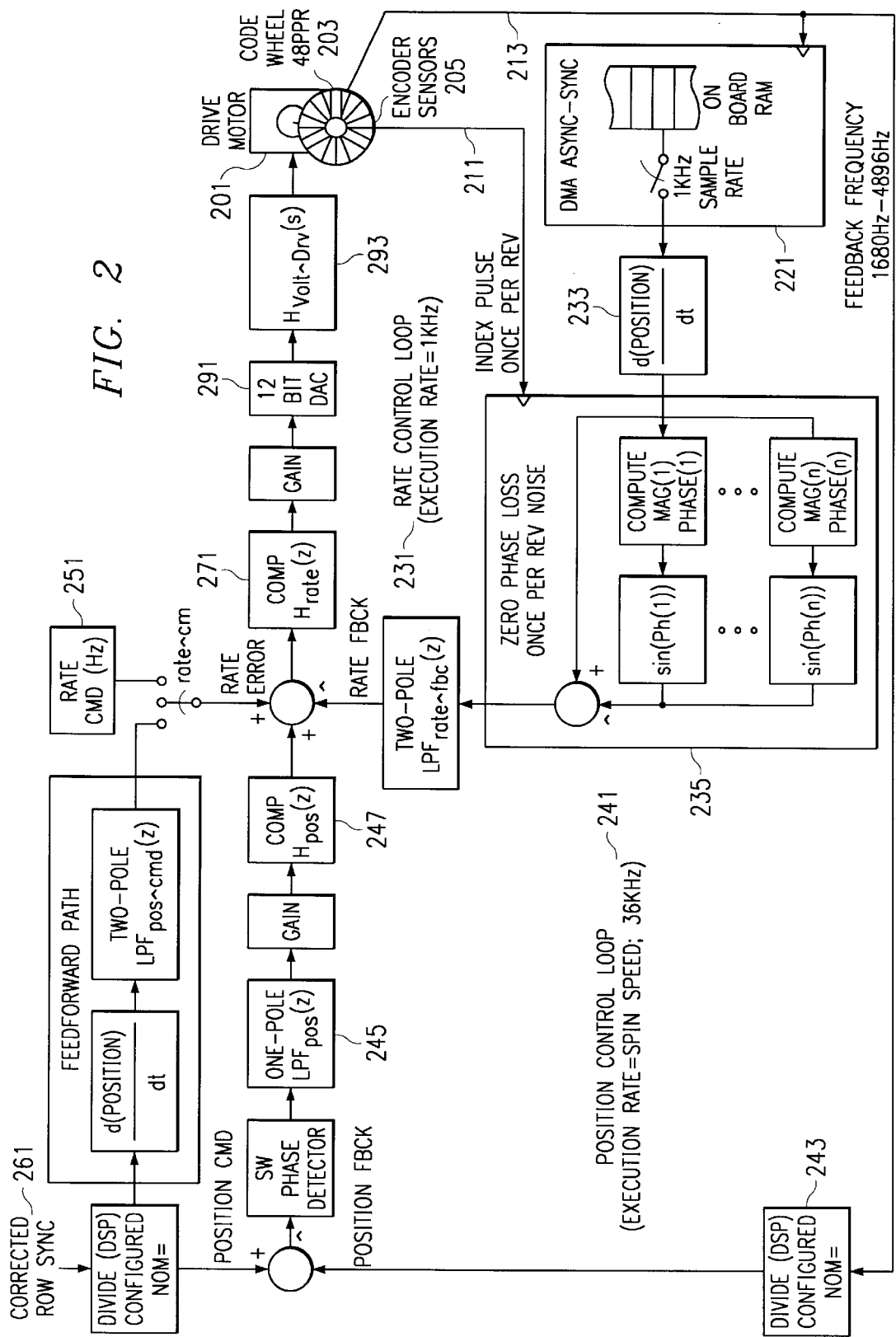
FIG. 2 illustrates a preferred embodiment system.
Figure 3A:
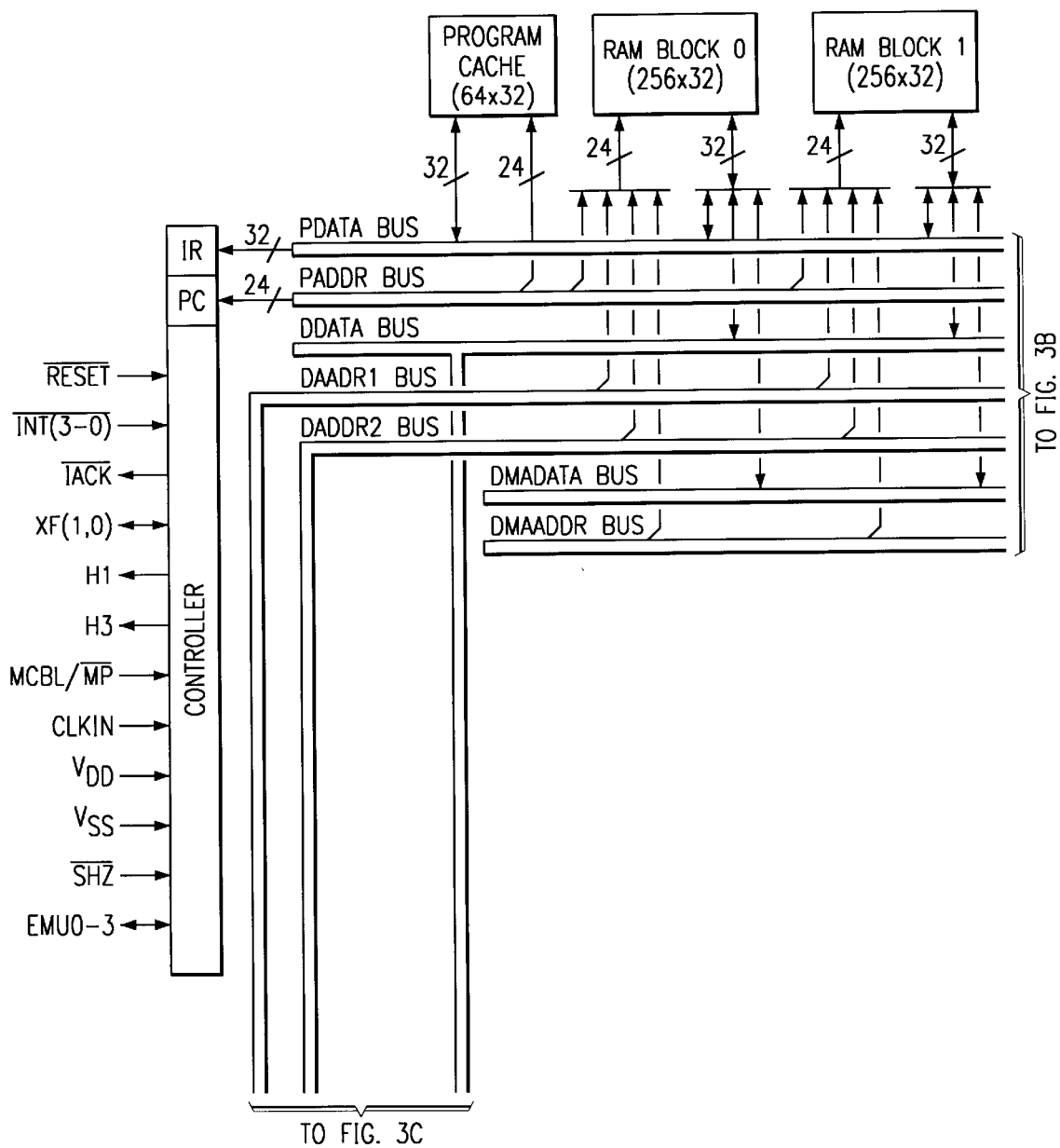
FIG. 3 is a functional block diagram of a DSP.
Figure 3B:
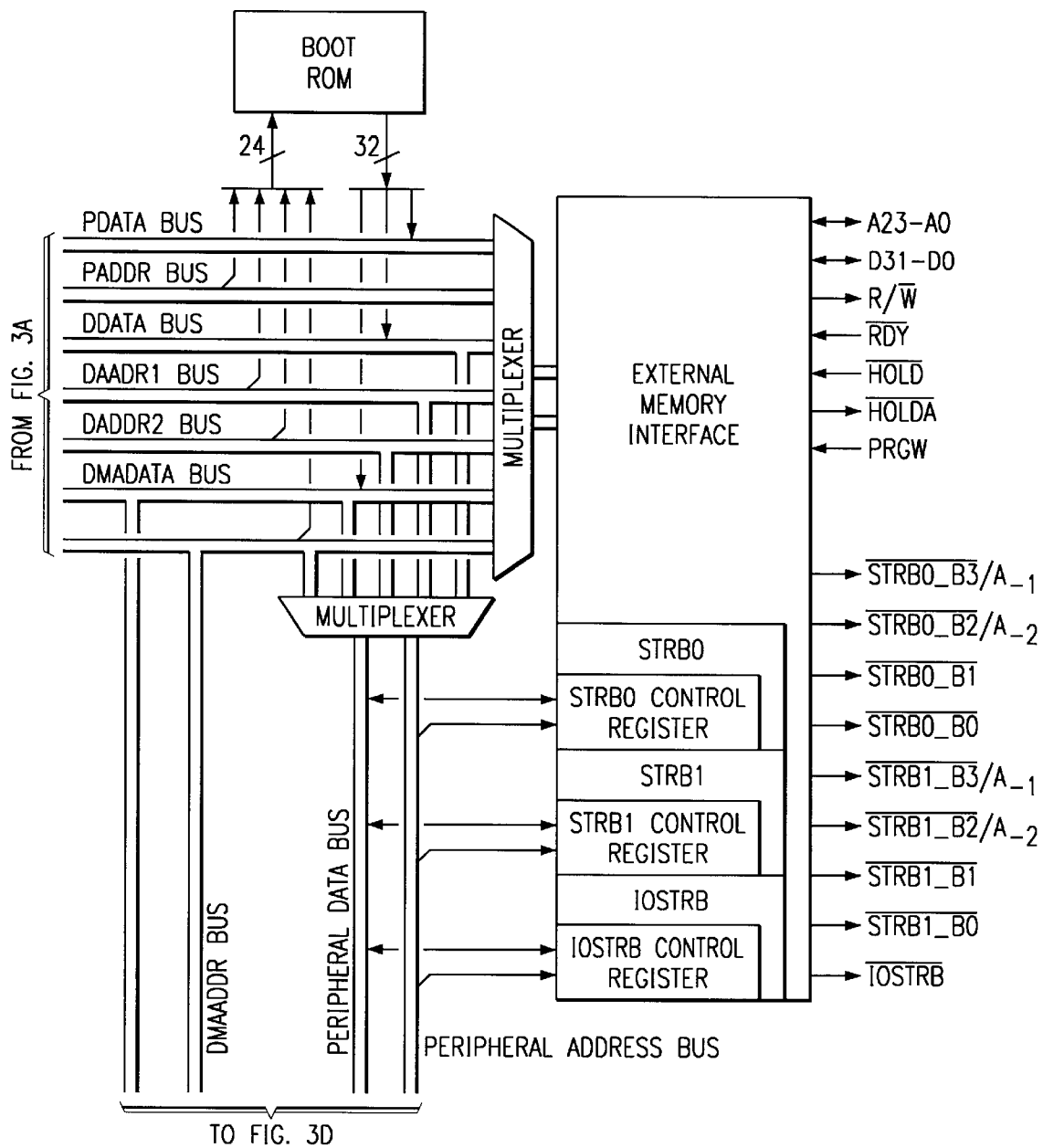
Figure 3C:
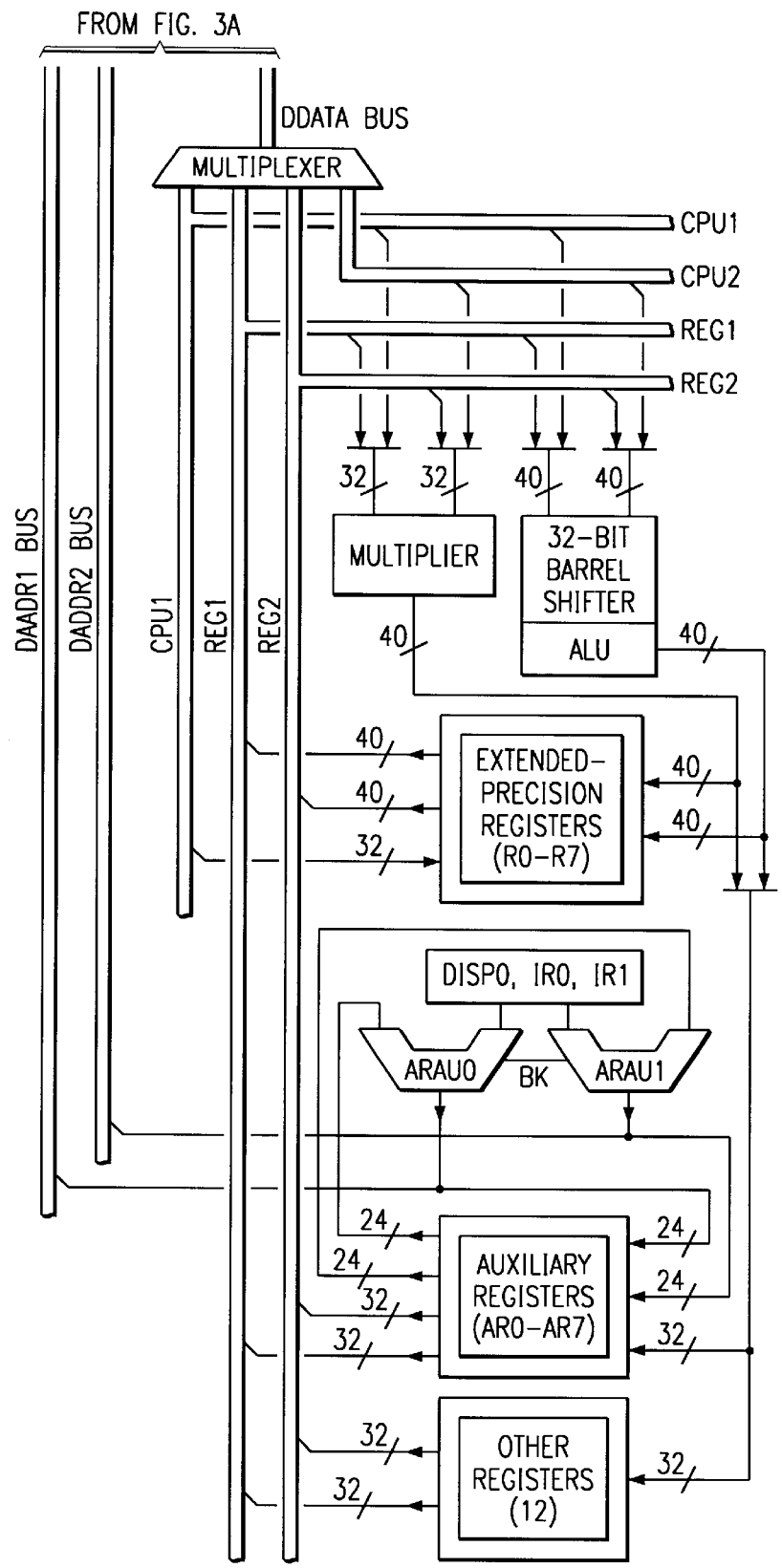
Figure 3D:
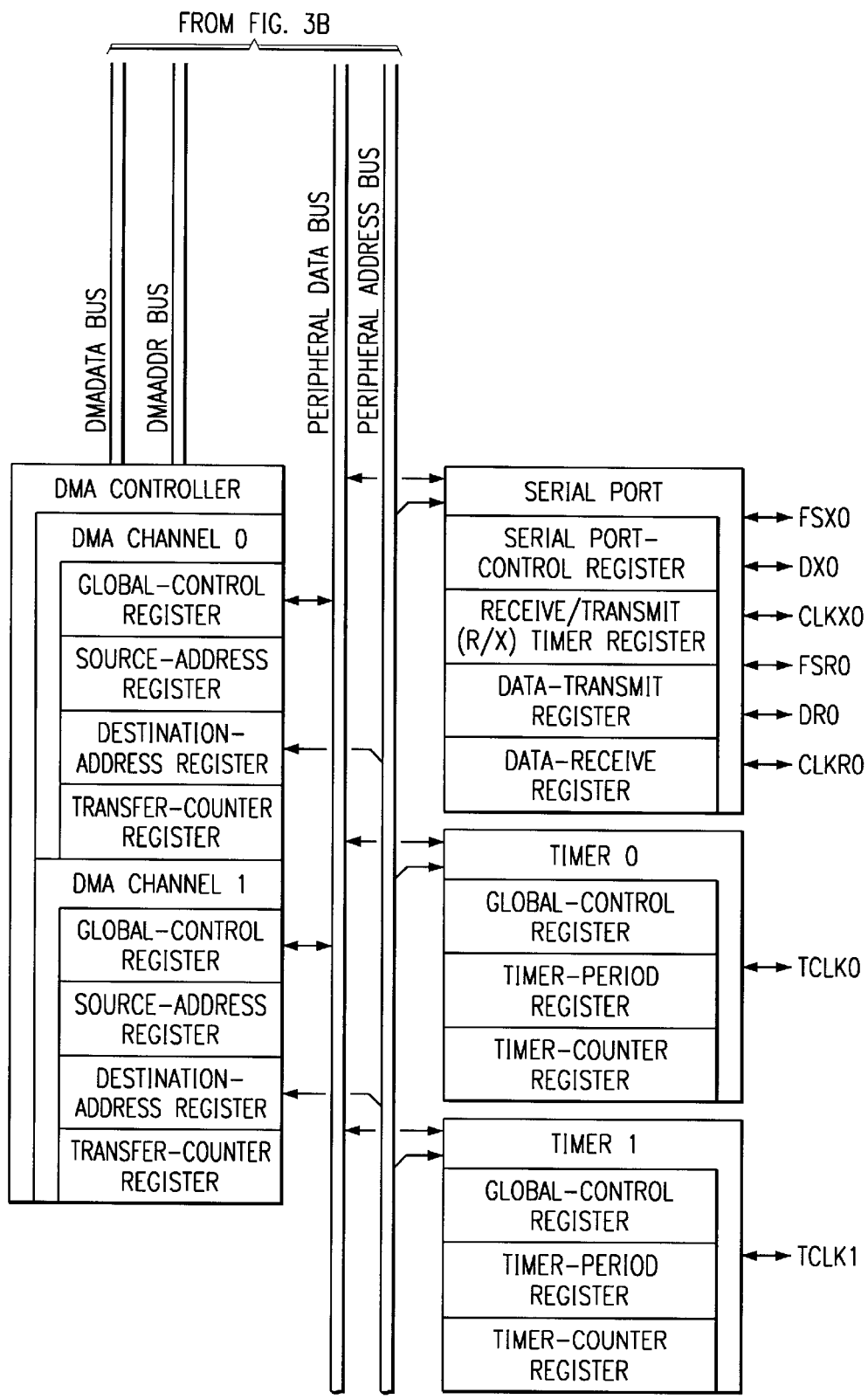

FIG. 2 shows a functional block diagram of a first preferred embodiment system to control the color wheel of a digital light exposure system which uses a digital micromirror device (DMD) type of spatial light modulator (SLM) plus a white light (arc lamp) to generate color images. In particular, electric motor 201 drives color wheel 203 (typically at speeds from 36 to 120 Hz) and encoder sensors 205 provide two pulse streams: pulse stream 211 has a one pulse per revolution of color wheel 203 and pulse stream 213 has one pulse per $\frac{1}{48}$ revolution. The pulse streams are analyzed in the rate control loop 231 and the position control loop 241 to detect rotation speed (Rate Fbck signal) and position (Position Fbck signal), respectively. The signals Rate Command 251 and Corrected Row Synchronization 261 come from the SLM control and indicate the timing of data loading in the SLM. A single DSP (such as the TMS320C32 of FIG. 3) can be used for the SLM control, the asynchronous position pulse acquisition, and the rate and position loop computations to output the motor control signals.

Color wheel 203 must synchronize with the SLM, and thus the preferred embodiments control motor 201 by the differences between the detected color wheel position and SLM-corresponding position plus the detected color wheel rotation rate and SLM-corresponding rate. The DSP performs most of the computations shown in FIG. 2; i.e., rate determination by division, one- and two-pole lowpass filtering, gain multiplication, filtering (transfer functions), etc.; although DAC 291 and power supply 293 typically would be a separate integrated circuit.

The pulse streams generate interrupts in the DSP (FIG. 3), and the interrupt handling asynchronously stores the time of each pulse (DSP timer 1 provides the time) in the next memory location of on-board RAM via the DMA of the DSP as indicated by block 221 and in more detail in FIG. 1. The 1 kHz sampling of the stored time increments provides the factors for division 233 to estimate the current rotation rate. These factors are the number of pulses or distance traveled and time of travel for the given distance represented in DSP timer 1 counts. The current rotation rate feeds block 235 which is used to remove periodic artifacts such as spin frequency noise. Such components, unless removed, compromise the true rate of color wheel. The output of block 235 feeds a two-pole-low-pass filter which removes high frequency noise. The output of the two-pole low-pass filter constitutes Filtered Rate Fbck. Also, position control loop 241 uses a divided position pulse stream in block 243 to yield the Position Fbck signal and compares this to a divided DMD corrected row synchro-nization. The divides for the command (DMD corrected row synchronization) and the feedback (position pulse stream) are set depending on the desired resolution of the DMD exposure system and the speed of the color wheel. The difference of the command and feedback is the phase error of the position control loop. To reduce high frequency noise the position error is multiplied by a one-pole-low-pass filter 245. The low-pass filter output is multiplied by gain to maximize bandwidth. The gain output is multiplied by a proportional integral transfer function 247 to maximize transmit response, while minimizing steady state error. The Rate Error is then computed as the difference of the Rate Cmd 251 and the Filtered Rate Fbck plus the position loop output. To enhance steady state performance of the color wheel rate, the rate error is multiplied by a proportional-integral transfer function 271. The output of this transfer function is multiplied by a gain term to maximize bandwidth. This output of gain drives the adjustments to the motor input power.

The Color Wheel Rate Loop Algorithm section of the code is executed at the sampling frequency (fs_rate, typically 1 kHz). The purpose of this algorithm is to provide the color wheel drive command from the following inputs: encoder pulse time duration values (derived from pulse streams 211, 213); position loop command; feedforward command (optional); and rate command (dc value).

Following the "Color Wheel Initialization Process" (initialization) described in the following, timer 0 of the scanner C32 will trigger a software interrupt at 1 KHz to execute the rate loop process. First, the rate loop process will disable all other interrupts until it has completed its task. Then upon each interrupt the rate loop process will read the group of encoder pulse values (developed by the DMA process) from RAMBLK 1. Before reading the dma destination register the DMA process is disabled to avoid read write contention problems.

The DMA destination register contains the last value written before the rate loop interrupt has occurred. Before reading the destination register the DMA process is disabled to avoid read write contention problems. After the DMA register is read the DMA process is re-enabled.

Following the "CWE" (color wheel enabled) bit the motor will start to spin creating a pulse stream from the encoder. Upon receiving an encoder pulse through interrupt 1, the C32 DMA process will read the timer 1 counter and store it to RAMBLK1. Following a store to the destination address in RAMBLK1, the destination address will be incremented by 1. The DMA will continue to perform this transfer for each encoder pulse received by interrupt 1 unless a system reset occurs, it is disabled by the rateloop process, or +5V power is withdrawn. The DMA destination address will be reset if the end of the defined word block of memory is reached. Hardware will provide the proper signal conditioning for each interrupt and interrupts are not cleared by the software or the CPU. In this application the steady state frequency rate of the encoder interrupts will occur from 1748.4 Hz to 5760 Hz. Each time the rate loop process occurs the last RAMBLK1 address (containing the last measured encoder pulse value before the rate loop interrupt) is stored as a temporary variable (initialized to be stored at location 809C00). This RAMBLK1 address is equal to the DMA destination address −1. By using this temporary variable the rate loop process determines how many encoder pulses have been received since the previous rate interrupt. The rate loop also extracts the time duration of each adjacent encoder pulse (with $1/15$ MHz of resolution). The number of pulses received (distance) is divided by the number of counts per pulse duration (time). The effective result is rate feedback. The rate feedback value is then put through a 2-pole low pass filter. The filtered average rate feedback is subtracted from the constant rate command and the position loop command. The result of this subtraction is called rate error. Compensation in the form of a PI is applied to the rate error value. The integral term is limited. The output of the PI is limited and appropriately scaled for the DAC.

Detailed C-language pseudo-code for this follows.

Rate Loop - DMA Processing Algorithm

```
/* DMA process global file variable */
int *ptr_ram1_start_address = (int *)0x809c00;
/* ram1 start address */
/* DMA Process Control Psuedo Code*/
if (rateloop_compute_flag) /*execution of rateloop depends on */
/* interrupts occurring at fs_rate */
{
if(*ptr_dma_dest > limit)
    {
        int_disable( );
        ptr_ram1_end_address = (int *) (*ptr_dma_dest - 1);
        *ptr_dma_dest = 0x809C01;
        int_enable ( );
        *ptr_contents = *ptr_ram1_end_address;
        reset_flag = 1;
    }
else
        ptr_ram1_end_address = (int *) (*ptr_dma_dest - 1);
/* Rate Feedback Determination From Encoder Feedback */
/* For each encoder pulse a contiguous timer value is stored in */
/* RAMBLCK1 */
/* Current Count is the accumulated time value from the last time */
/* the rateloop read the RAM1Block. It is the value in the RAM1 */
/* End Address. */
current_count = *ptr_ram1_end_address;
number_of_pulses = ptr_ram1_end_address - ptr_ram1_start_address;
ptr_index = ptr_ram1_end_address;
/* Add up all of the values in each RAM location until you */
/* get to the beginning location in RAM */
/* If no pulses have been received since the last rateloop */
/* execution then use the same ratefdbck_d0 value used in */
/* the last run. I.E., only update the rateloop with new */
/* information if a pulse has been received. */
if(ptr_index > ptr_ram1_start_address)
    {
        while (ptr_index > ptr_ram1_start_address)
        {
            ptr_index--;
            previous_count = *ptr_index;
            if (current_count < previous_count)
```

-continued

Rate Loop - DMA Processing Algorithm

```
            pulse_width = current_count + (0x7FFFFFFF -
            previous_count);
        else
            pulse_width = current_count - previous_count;
        if (pulse_width > 0)
            pulse_total = pulse_width + pulse_total;
        else
        {
            spurious_int = spurious_int + 1;
            number_of_pulses--;
        }
        current_count = previous_count;
    }
    cw_fdbk_freq = number_of_pulses/pulse_total -
```

-continued

Rate Loop - DMA Processing Algorithm

```
    correction(n);
            ratefdbk_d0 = cw_fdbk_freq * K_fbck;
    }
```

Rate Loop Processing Algorithm & Reset DMA Handling

This algorithm provides the control loop transfer functions and general rate loop implementation. This algorithm also provides handling of the reset associated with the rate pulse DMA capture system.

```
/* Two-Pole Low Pass Filter Implementation */
    rate_fb_1pf2p.d[0] = - rate_fb_1pf2p.a[1] *
rate_fb_1pf2p.d[1]
                    - rate_fb_1pf2p.a[2] *
rate_fb_1pf2p.d[2]
                    + rate_fb_1pf2p.b[0] * rate_fbfdbk_d0
                    + rate_fb_1pf2p.b[1] * rate_fbfdbk_d1
                    + rate_fb_1pf2p.b[2] * rate_fbfdbk_d2;
    rate_fb_1pf2p.d[2] = rate_fb_1pf2p.d[1];
    rate_fb_1pf2p.d[1] = rate_fb_1pf2p.d[0];
    ratefdbk_d2 = ratefdbk_d1;
    ratefdbk_d1 = ratefdbk_d0;
    rate_error = rate_cmd - rate_1pf2p.d[0];
    valued0 = (rate_error + pos_cmd) * rate_gain;
/* Proportional-Integral With Integral Limit Implementation */
    rate_pi.integ_out_d0 = rate_pi.integ_out_d1
                    + rate_pi.kiz *
                    (valued0 + valued1);
    valued1 = valued0;
    if (rate_pi.integ_out_d0 >= rate_pi.limit)
        rate_pi.integ_out_d0 = rate_pi.limit;
    if(rate_pi.integ_out_d0 <= -rate_pi.limit)
        rate_pi.integ_out_d0 = -rate_pi.limit;
    rate_pi.integ_out_d1 = rate_pi.integ_out_d0;
    pout = rate_pi.kp * valued0;
    drive = (rate_pi.integ_out_d0 + pout);
    if (drive >= 5.0)
        drive = 5.0;
    if(drive <= 0.0)
        drive = 0.0;
/* Stuff the D/A with the computed value */
    d2a_cmd = -(d2a_scale * drive +d2a_offset);
/* Reset of rate pulse DMA capture system.*/
    if(reset_flag)
    {
        ptr_ram1_start_address = (int *)0x809C04;
        reset_flag = 0;
    }
    else
        ptr_ram1_start_address = ptr_ram1_end_address;
}
    Constants:
/* Low Bandwidth Rate Loop Constants in S-Domain */
/* Input to Compensation Math Routine to Determine Digital Coefficients */
lbw_rate_fc = 100.000;
lbw_rate_zeta = 0.707;
lbw_rate_gain = 1.000;
lbw_rate_cmd = 35.000;
lbw_rate_kp = 2.000;
lbw_rate_ki = 1.000;
lbw_rate_limit = 3.000;
/* High Bandwidth Rate Loop Constants, in S-domain */
/* Input to Compensation Math Routine to Determine Digital Coefficients */
```

```
hbw_rate_fc = 0.000;
hbw_rate_zeta = 0.000;
hbw_rate_gain = 0.000;
hbw_rate_cmd = 0.000;
hbw_rate_kp = 0.000;
hbw_rate_ki = 0.000;
hbw_rate_limit = 0.000;
/* Non Control Loop Rate Loop Constants */
limit = 0x309E50;
d2a_offset = 0.0; /* define the 0 point of the scale*/
d2a_scale = 4096/5.0; /* bits/volt 2**12 over 5 */
                     /* volts scale factor of the */
                     /* AD5320 - D/A Converter */
k_fbck = 156250; /* K_fbck num pulses/pulse total*/
                 (208,333.333 for k_fbck with the BB system)
Relationships: (for an input frequency and DSP clock speed determine k_fbck)
rate_cmd = input frequency/48
counts of free running timer (counts) = (1/input frequency (sec)) * (h1 clock/2
(counts/sec)
k_fbck = rate_cmd/(1/counts of free running timer)
Initialization:
reset_flag = 0;
pulse_total = 0;
spurious_int = 0;
current_count = 0;
previous_count = 0;
number_of_pulses = 0;
pulse_width = 0;
temp = 0;
*ptr_dma_dest = (int *) 0x808006;
*ptr_contents = (int *) 0x809C00;
    Output to the DAC
    d2a_cmd
        Destination: Hardware
        Description: Command from the Rate Loop to the DAC
        Type: Integer
        Range: −50000 to 50000
```

Color Wheel Control C32 Initialization

The Color Wheel Initialization Algorithm code is executed only at boot-up of the C32 DSP. The following parameters will be input to this function.

```
fs_rate
    Source: Color Wheel Constants Passed from "Main"
    Description: Rate Loop execution rate in Hz
    Type: Integer
    Range: 1 to 50000 (set initially at 1000 (Hz))
tim1period
    Source: Color Wheel Constants Passed from "Main"
    Description: Free Running Timer Rollover Rate (Timer used to determine
            rate pulse intervals)
    Type: Integer
    Range: 0 to 2,147,483,647 (For 15 MHz input freq = 2.38seconds)
            0 to 7FFFFFFF (initialized to 7FFFFFFF, roll-over every
            2.38 seconds
```

Initialize the C32 timer0 internal 32-bit timer. Timer0 is reset to 0 and begins incrementing using the internal clock signal, H1. The timer frequency input is equal to the internal input clock, H1 clock, divided by 2. For 60 MHz DSP input clock the rate of the timer is 15e6 counts/sec. Pseudo and C code is provided below.

The CPU interrupt for the timer is also enabled. This timer period register is loaded with a count which corresponds to a desired interrupt frequency which can be computed by:

fs_rate=interrupt frequency

| Color Wheel Speed | Feedback Frequency | Fs_rate (Interrupt (Frequency) | Rate Loop BW |
|---|---|---|---|
| 36.425 Hz | 1748.4 Hz | 1000 Hz | 100 Hz |
| 102.5 Hz | 4920 Hz | 1000 Hz | 100 Hz |

Choose an f_s of 1 KHz to get a Rate Loop BW of 100 Hz. Timer data is moved to RAMBLOCK1 at a minimum steady state rate of 1748.4 Hz. Data is extracted from RAMBLOCK1 at a rate of 1 KHz as a result of Rateloop Execution. During ramp up, the data rate of timer value transfer to RAMBLOCK1 will be significantly less than 1 Khz. If new data is not available, when the Rateloop Process executes at 1 Khz, the loop will still execute with the previous value extracted from the RAM location. Indication that fresh, new data is not available is captured when the value of the current_count=*ptr_ram1_end_address is the same for subsequent reads.

tim0period=clock frequency/interrupt frequency tim0period=(60MHz/4)/1 Khz 15000 counts=15e6 counts/sec/1 Khz An interrupt is generated when the counter register increments to the value of the period register. The counter register automatically resets to zero when this event occurs.

```
/* Setup Rate Loop Interrupt Rate*/
void timer0_init(float fs_rate)
{
    int *ptr_control;
    int *ptr_period;
    int *ptr_count;
/* generates rate_loop_compute_flag (rateloop interrupt) */
    tim0period = (h1_clock/2)/fs_rate;
            /* 15000 counts at 15MHz */
            /* causes a rateloop interrupt */
            /* at 1KHz */
    ptr_control= (int *) 0x808020; /* pointer to control register */
    ptr_count = (int *) 0x808024; /* pointer to count register */
    ptr_period = (int *) 0x808028; /* pointer to period register */
    asm(" or 100h, ie"); /* enable interrupt for timer0 */
```

```
    *ptr_count = 0; /* load count */
    *ptr_period = tim0period; /* load timer0 period */
    *ptr_control= 0x2C1; /* load timer0 control word */
}
```

Free-running Counter Setup for DMA (to Measure CW Rate Feedback)

This routine initializes the C32 timer1 internal 32-bit timer. Timer1 is reset to 0 and begins incrementing using the internal clock signal, H½. The theoretical value of the clock is 15e6 counts/sec. This counter is free running and resets to 0 after reaching the maximum count value. The maximum count value 0FFFFFFFFh.

```
/* Timer 1 Configuration */
void timer1_init(int tim1period)
{
    int *ptr_control, *ptr_period, *ptr_count;
    ptr_control= (int *) 0x808030; /* pointer to control register */
    ptr_count = (int *) 0x808034; /* pointer to count register */
    ptr_period = (int *) 0x808038; /* pointer to period register */
    asm(" or 200h, ie") ; /* enable interrupt for timer1 */
    *ptr_count = 0; /* load count */
    *ptr_period = tim1period; /* load timer1 period */
    *ptr_control= 0x3C3; /* load timer1 control word */
}
```

DMA Setup for Color Wheel Rate Feedback Determination

This routine initializes the DMA process. It sets up the DMA Global control register to 143H; the source register is set to Timer1 count; the destination register is set to RAMBLK1. The DMA will transfer the current Timer1 count to RAMBLK1 for each EXINT2. Once the transfer is completed the RAMBLK1 will be incremented.

```
/* DMA Initialization Routine */
void dma_init( )
{
    int *ptr_dma_control, *ptr_dma_source, *ptr_dma_dest,
        *ptr_dma_xfrcnt;
    int *ptr_ram1_start;
    ptr_dma_control = (int *) 0x808000; /* pointer dma global control*/
    ptr_dma_source = (int *) 0x808004; /* pointer dma source address*/
    ptr_dma_dest = (int *) 0x808006; /* pointer dma destination */
    ptr_dma_xfrcnt = (int *) 0x808008; /* pointer dma transfer count*/
    ptr_ram1_start = (int *) 0x809C00; /* pointer ram1 start address*/
    *ptr_dma_control = 0x143;      /* setup dma global control see */
                                   /* pages 8–40,41 */
                                   /* 1) DMA starts from reset or */
                                   /* restarts from previous state */
                                   /* 2) Destination register is */
                                   /* incremented after every write */
                                   /* 3) Source Synchronization a */
                                   /* a read is performed when an */
                                   /* enabled interrupt occurs. */
    *ptr_dma_source = 0x808034;    /* setup dma source address */
                                   /* to be timer1 */
    *ptr_dma_dest = 0x809C01;      /* setup dma destination address */
                                   /* to be RAMBLK1 */
    *ptr_dma_xfrcnt = 0x20;        /* the dma will transfer the current */
                                   /* timer1 count to RAMBLK1 for each */
                                   /* EXTINT1. After each transfer is */
```

-continued

```
                                    /* completed RAMBLK1 address will */
                                    /* be incremented. (32 values) */
    *ptr_ram1_start = 0x00;         /* initialized ram1 start address */
}
        Constants:
float pos_fs = 24.000; /* sampling frequency of position loop*/
float rate_fs = 1000.000; /* sampling frequency */
```

Modifications

The preferred embodiments can be modified in various ways while retaining the features of asynchronous position pulses driving an interrupt to store pulse times via direct memory access and synchronous sampling and analysis of the stored position pulse timings providing rate detection. For example, the sampling and position pulse rates may be varied, multiple input pulse streams may be merged with separate interrupts, and so forth.

What is claimed is:

1. A rate detection method, comprising:

(a) generating interrupts in response to an input stream;

(b) storing timer values in response to said interrupts; and (c) sampling at a sampling rate said stored timer values to determine a rate related to said input stream.

2. The method of claim 1, wherein:

(a) said interrupts activate direct memory access of a digital signal processor; and (b) said digital signal processor includes a timer which generates said timer values.

3. The method of claim 1, wherein:

(a) said input stream is the output of a rotation sensor.

4. A rate detector for a rotation device, comprising:

(a) a rotation sensor coupled to a rotation device, said rotation sensor outputs a stream of pulses related to rotation rate:

(b) a timer;

(c) a memory;

(d) a memory accessor coupled to said timer, to said memory, and to outputs of said rotation sensor, wherein an output pulse of said rotation sensor stores the contents of said timer in said memory; and (e) a rate detector coupled to said memory, wherein said rate detector determines a rotation rate from sampling at a sampling rate said timer contents stored in said memory.

5. The rate detector of claim 4, further comprising:

(a) a feedback controller coupled to output of said rate detector and to a rotation device, wherein said rotation sensor detects rotation of said rotation device.

6. A rate detector for a rotation device, comprising:

(a) a rotation sensor coupled to a rotation device, said rotation sensor with output a stream of pulses related to rotation rate;

(b) a programmable signal processor with interrupt input coupled to outputs of said rotation sensor, said programmable signal processor programmed to:

(i) store time values in response to said interrupts; and (ii) sample at a sampling rate said stored timer values to determine a rate related to said interrupts.

* * * * *